United States Patent [19]

Fling

[11] Patent Number: 4,550,339

[45] Date of Patent: Oct. 29, 1985

[54] BINARY DIVIDER AS FOR A DIGITAL AUTO FLESH CIRCUIT

[75] Inventor: Russell T. Fling, Noblesville, Ind.

[73] Assignee: RCA Corporation, Princeton, N.J.

[21] Appl. No.: 554,082

[22] Filed: Nov. 21, 1983

[51] Int. Cl.[4] .......................................... H04N 9/535
[52] U.S. Cl. ................................... 358/28; 358/21 R;
364/766
[58] Field of Search ..................... 358/28, 27, 21 R;
364/766, 767

[56] References Cited

U.S. PATENT DOCUMENTS 4,381,550  4/1983  Baker .................................. 364/766

OTHER PUBLICATIONS

An Algorithm for Rapid Binary Division, Wilson and Ledley, IRE Transactions on Electronic Computers, Dec. 1961, pp. 62–70.
An Algorithm for Non-Restoring Division, Sanyal, Computer Design, May 1977, pp. 124–127.
W. Demmer et al., "Pipelining-Verfahren in der Digitalen Signalverarbeitung", *Elektronik*, 12.2.1982, pp. 73–77.

*Primary Examiner*—Michael A. Masinick
*Attorney, Agent, or Firm*—E. M. Whitacre; P. J. Rasmussen; E. P. Herrmann

[57] ABSTRACT

A pipelined binary divider which operates at video rates which consists of N like subtraction stages coupled in cascade. Each subtraction stage includes a latch for storing the divisor, the partial quotient and a modified dividend from the previous stage. A binary multiplier is arranged to multiply the latched modified dividend by a factor of two, the result being applied as the minuend to a binary subtractor and to one input of a multiplexer. The latched divisor is applied as the subtrahend to the subtraction circuit. The sign bit from the subtraction circuit controls the multiplexer to selectively pass the multiplied dividend as the dividend to the succeeding stage, for negative differences, or the magnitude of the difference from the subtraction circuit for positive differences. The sign bit is complemented and applied as an additional least significant bit (LSB) to the partial quotient. Each stage adds one bit to the quotient. In the cascade combination of the aforedescribed stages, each stage is performing a partial quotient subtraction for respective ones of N successive quotients, the first stage performing the first subtraction of the (R+N)th quotient and the last stage performing the last subtraction of the Rth quotient.

14 Claims, 9 Drawing Figures

| SAMPLE TIME | $T_1,\phi_1$ | $T_2,\phi_2$ | $T_3,\phi_3$ | $T_4,\phi_4$ | $T_5,\phi_1$ | $T_6,\phi_2$ | $T_7,Q_3$ | $T_8,Q_4$ |
|---|---|---|---|---|---|---|---|---|
| I,Q | $I_n$ | | $Q_n$ | | $I_{n+1}$ | | $Q_{n+1}$ | |
| A | $I_n$ | | | | $I_{n+1}$ | | | |
| B | $Q_{n-1}$ | | $Q_n$ | | | | $Q_{n+1}$ | |
| C | $Q_{n-1}/I_{n-1}$ | | $Q_n/I_n$ | | | | $Q_{n+1}/I_{n+1}$ | |
| D | SIN n−1 | | | SIN n | | | | SIN n+1 |
| E | COS n−1 | | | COS n | | | | COS n+1 |
| F | $I_{n-1}$ | | $I_n$ | | | | $I_{n+1}$ | |
| G | $Q_{n-1}$ | | | | $Q_n$ | | | |
| H | $Q_{n-1}$ | $I_{n-1}$ | $Q_{n-1}$ | $I_n$ | $Q_n$ | $I_n$ | $Q_n$ | $I_{n+1}$ |
| J | $SIN_{n-1}$ | $SIN_{n-1}$ | $COS_{n-1}$ | $COS_n$ | $SIN_n$ | $SIN_n$ | $COS_n$ | $COS_{n+1}$ |
| K | $I_{n-1} \times COS_{n-1}$ | $Q_{n-1} \times COS_{n-1}$ | $-I_{n-1} \times SIN_{n-1}$ | $Q_{n-1} \times COS_{n-1}$ | $I_n \times COS_n$ | $Q_n \times SIN_n$ | $-I_n \times SIN_n$ | $Q_n \times COS_n$ |
| L | $Q_{n-2} \times COS_{n-2}$ | $I_{n-1} \times COS_{n-1}$ | $Q_{n-1} \times SIN_{n-1}$ | $-I_{n-1} \times SIN_{n-1}$ | $Q_{n-1} \times COS_{n-1}$ | $I_n \times COS_n$ | $Q_n \times SIN_n$ | $-I_n \times SIN_n$ |
| M | * | $Q_{n-1}SIN + I_{n-1}COS$ | * | $Q_{n-1}COS - I_{n-1}SIN$ | * | $Q_n SIN + I_n COS$ | * | $Q_n COS - I_n SIN$ |

ARGUMENTS OF $SIN_i, COS_i$ ARE $\Delta\phi_i$

| TIME | STAGE | DIVIDEND INPUT | 2 X DIVIDEND | DIVIDEND OUTPUT | DIVISOR | DIFFERENCE | $\overline{SIGN}$ | QUOTIENT |
|---|---|---|---|---|---|---|---|---|
| $T_1$ | 1 | 0010 | 00100 | 0100 | 1110 | 10110 | 0 | 0 |
| $T_2$ | 2 | 0100 | 01000 | 1000 | 1110 | 11010 | 0 | 00 |
| $T_3$ | 3 | 1000 | 10000 | 0010 | 1110 | 00010 | 1 | 001 |
| $T_4$ | 4 | 0010 | 00100 | 0100 | 1110 | 10110 | 0 | 0010 |
| $T_5$ | 5 | 0100 | 01000 | 1000 | 1110 | 11010 | 0 | 00100 |
| $T_6$ | 6 | 1000 | 10000 | 0010 | 1110 | 00010 | 1 | 001001 |

BINARY DIVIDER AS FOR A DIGITAL AUTO FLESH CIRCUIT

BACKGROUND OF THE INVENTION

The present invention relates to apparatus for performing digital or binary division. In particular the invention is a special purpose pipelined divider for use when the dividend is smaller than the divisor. A particularly useful application is in the division of quadrature related signals for determining the tangent defined by their ratio or more specifically the arctangent.

Binary division is typically a time-consuming operation with currently available devices precluding real time division at high sample rates, or requires a relatively large number of devices to perform high speed division. One method of high speed division of the latter category is performed by determining the reciprocals of the divisor and multiplying the dividend with the reciprocals. The reciprocals may be obtained from a look-up memory such as a ROM. But as is well known by those skilled in the art of binary digital signal processing, high speed binary multipliers are both very complex and consume significant power.

Low speed dividers on the other hand are considerably less complex and operate on the principle of successive subtractions. Straight forward successive subtraction is performed as follows. The dividend is loaded into a register having parallel output terminals. The output terminals are coupled to the minuend input port of a binary subtraction circuit. The divisor is coupled to the subtrahend input port of the subtraction circuit. The difference produced is subsequently loaded into the register and the divisor subtracted therefrom. This process is iterated until a zero or negative difference is produced. Each of the respective subtractions increment a counter circuit. The value in the counter after the first zero or negative difference is produced corresponds to the desired quotient. It is readily realized that this iterative method requires a significant number of process operations rendering the procedure relatively slow.

This latter procedure can be increased in speed if the individual subtractions for successive quotients are performed in parallel so that successive final quotients are produced at the sample rate. That is, the calculations are pipelined. The procedure is further simplified for quotients of fixed accuracy if the divisor is always smaller than the dividend so that a minimum number of processing steps will produce the desired accuracy.

SUMMARY OF THE INVENTION

The present invention is a pipelined binary divider which consists of N like subtraction stages coupled in cascade. In one embodiment for dividing a dividend by a larger divisor each of the subtraction stages includes a latch for storing the divisor, the partial quotient and a modified dividend from the previous stage. A binary multiplier is arranged to multiply the latched modified dividend by a factor of two, the result being applied as the minuend to a binary subtractor and to one input of a multiplexer. The latched divisor is applied as the subtrahend to the subtraction circuit. The sign bit from the subtraction circuit controls the multiplexer to selectively pass the multiplied dividend as the dividend to the succeeding stage, for negative differences. The multiplexer is controlled by the sign bit to pass the difference from the subtraction circuit for positive differences. The sign bit is a logic one for a negative difference or a logic zero for a positive difference. The sign bit is also complemented and applied as an additional least significant bit (LSB) to the partial quotient. Each stage adds one bit to the quotient. The quotient produced is actually $2^N$ times the desired quotient. In a cascade combination of the aforedescribed stages, each stage is performing a partial quotient subtraction for each of N successive quotients, the first stage performing the first subtraction of the (R+N)th quotient and the last stage performing the last subtraction of the Rth quotient.

DETAILED DESCRIPTION OF THE INVENTION

Composite video signal includes a luminance and a chrominance component. The chrominance component contains color information. It is an amplitude and phase modulated sinusoid and as such is defined as a phasor. Processing of the chrominance component, in a digital video system, is usually performed on a pair of quadrature related color mixture (or color difference) signals, the vector sum of which corresponds to the chrominance signal. Thus, in the digital video processing context, the chrominance signal may be considered to be a vector. In the following description, the terms vector and phasor are used interchangeably regarding the chrominance signal.

Figure 1:
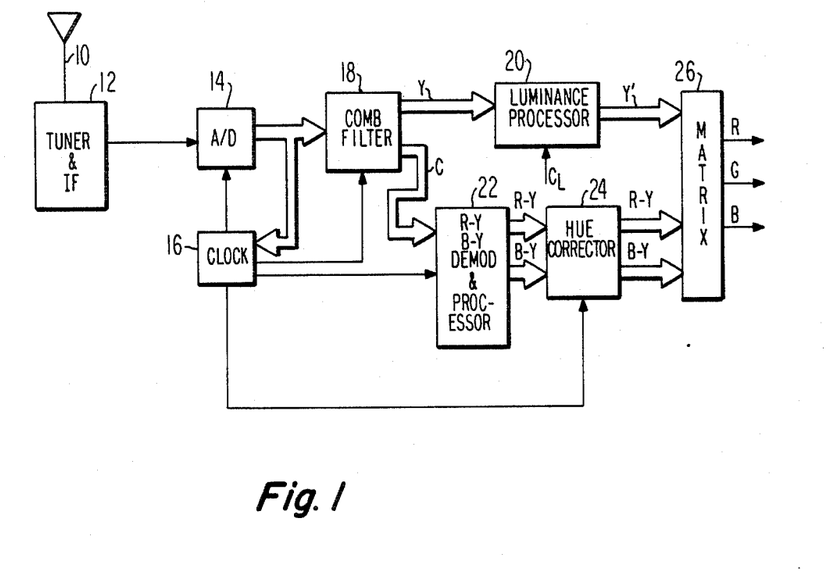
FIG. 1 is a block diagram of a digital television receiver including a hue correction circuit.

FIG. 1 is a block diagram of a digital TV receiver showing the basic processing blocks including a hue correction circuit. A standard television signal, e.g., NTSC, is received by antenna 10 and applied to conventional analog tuning and intermediate frequency circuits 12. Baseband composite signal from element 12 is applied to the analog input terminal of an analog-to-digital converter 14 which is controlled by the clock generator circuit 16 to sample the signal at four times the color subcarrier frequency. The analog-to-digital converter preferably produces binary samples in e.g., pulse code modulated (PCM) two's complement format at the sample rate. The PCM samples are applied to the clock generator circuit 16 wherein the sampling signal is phase locked with the color burst reference component of the composite signal. Clock generator 16 also generates the requisite clock signals to synchronously operate the remaining digital processing circuits.

The PCM signals from the analog-to-digital converter are also applied to a comb filter 18 wherein the luminance component, Y, and the chrominance component, C, of the composite signal are separated. The luminance component is applied to the luminance processing element 20 wherein it is appropriately conditioned for application to the color matrix circuit 26. The chrominance component is applied to element 22 in which it is filtered, processed and demodulated into color mixture components I and Q or (R-Y) and (B-Y). The processed color mixture signals from element 22 are applied to the hue correction circuit 24, which may be a manual hue control or an automatic fleshtone correction circuit. Hue control circuit 24 corrects color distortions by effectively rotating the chrominance vector by altering the (R-Y) and (B-Y) components. The corrected chrominance vector has corrected component signals (R-Y)' and (B-Y)' or I' and Q'. These corrected components are applied to the matrix 26 where they are combined with the processed luminance samples Y' to generate RGB color signals to drive the display tube.

Figure 2:
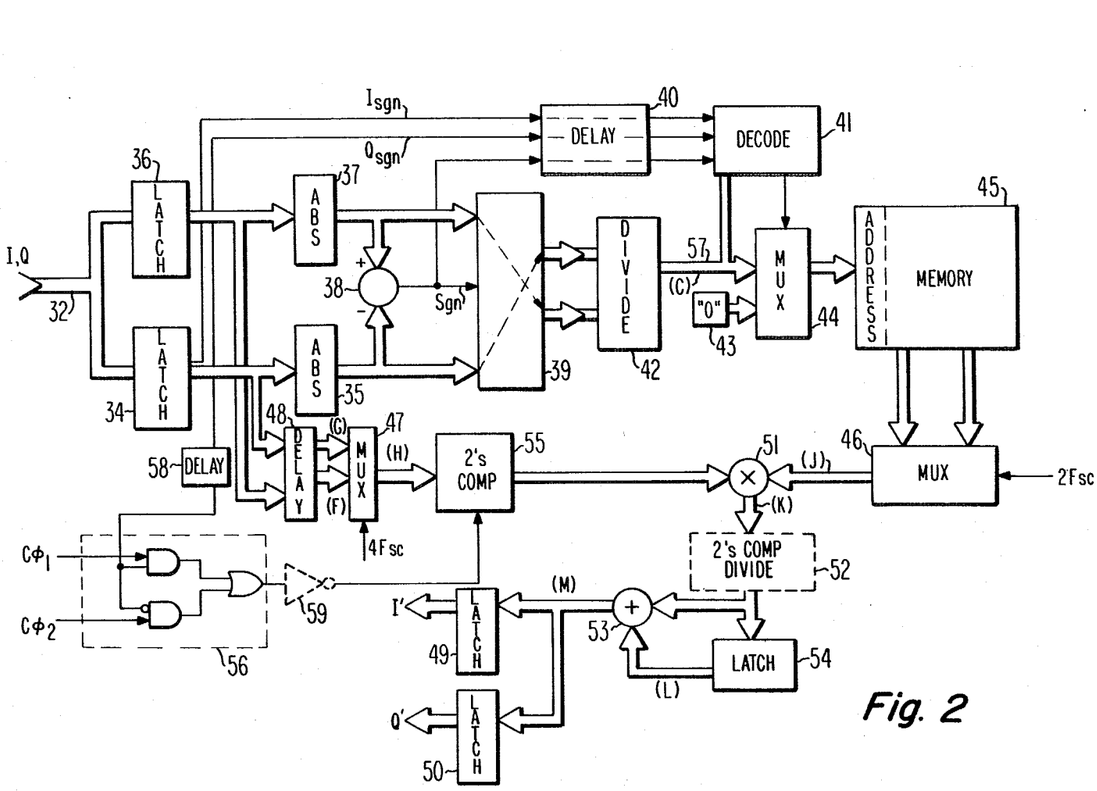
FIG. 2 is a logic schematic of an automatic hue correction apparatus embodying the present invention.

FIG. 2 is a representative hue control circuit of the type which may be employed for element 24 in FIG. 1. The operation of the FIG. 2 circuit will be described with reference to FIG. 3. I and Q color mixture signals, rather than (R-Y) and (B-Y) color mixture signals are used in the description to simplify the notation of FIG. 3 but the operation of the circuit is basically the same for both sets of quadrature related color mixture signals.

Color information is contained in the angle of the vector or phasor defined by the vector sum of the I and Q color mixture signals relative to a fixed reference determined by the phase of the color burst. It can be shown that the chrominance phasor may be rotated, relative to burst, by an amount equal to the angle $\Delta\phi$ by forming the sums of products $$I' = I \cos \Delta\phi \pm Q \sin \Delta\phi \quad (1)$$

$$Q' = Q \cos \Delta\phi \mp I \sin \Delta\phi \quad (2)$$

where I' and Q' are the magnitudes of the rotated quadrature related color mixture signals representing the rotated chrominance Vector. For a (+) sign in equation (1) and a (−) in equation (2), for positive correction factors equations (1) and (2) produce a counter clockwise rotation of the vector. With (−) and (+) signs respectively in equations (1) and (2), the sums produce clockwise vector correction rotation for positive correction factors.

For manual hue control the values $\Delta\phi$ are the same for all values of the chrominance vector angles. For auto flesh correction the chrominance vector is rotated different amounts depending on the instantaneous chrominance angle. Typically auto flesh correction is performed for chrominance vector angles in the range of ±90 degrees from the I axis with a maximum correction being applied for the instantaneous chrominance vector residing near ±45 degrees from the I axis.

To be able to perform auto flesh correction the instantaneous value of the angle of the vector sum of I and Q, or a signal related to the instantaneous angle, must be determined at a rate commensurate with the video bandwidth. A convenient reference angle is the angle between the vector sum of I and Q and the I axis since the I axis is typically associated with normal flesh tones. This angle is equal to the arctangent of the magnitude of Q divided by the magnitude of I. However, it is unnecessary to calculate the arctangent since the required angle information can be extracted from the quotient defined by Q/I. Thus the need for a high speed divider circuit.

The instantaneous quotients Q/I can be applied to the address input of a memory device, e.g., a ROM, programmed to produce the appropriate correction factors, $\sin \Delta\phi$ and $\cos \Delta\phi$, for the chrominance angle related to the instantaneous quotient. The instantaneous I and Q color mixture signals are then multiplied by these factors and the sums defined by equations (1) and (2) are produced.

By appropriately phasing the four-times subcarrier sampling clock applied to the A/D converter 14, the sequence of consecutive chrominance samples output by the comb filter 18 will be of the form $I_n, Q_n, -I_n, -Q_n, I_{n+1}, Q_{n+1}, -I_{n+1}, -Q_{n+1}$ etc. where the samples include magnitude and polarity information. Note, the signs associated with the respective samples in the sequence do not indicate the polarity of the samples but rather the phase of the sampling clock. The $\pm I_n$ and $Q_n$ samples may be either polarity. The necessary information to reproduce all the color information is contained equally in both the positive and negative sample values. It is convenient and efficient to process only half of the available samples and it will be presumed that only the +I and +Q samples are applied to the FIG. 2 circuit. The sequence of +I and +Q samples represent demodulated, interleaved I and Q color difference signals. The demodulated sequence of I, Q samples is illustrated by the I, Q) sample sequence of FIG. 3 which sequence is applied to bus 32 in FIG. 2. The I samples are latched in element 34 which produces the demodulated I sample sequence (A) in FIG. 3 and the Q samples are latched in element 36 which produces the demodulated Q sample sequence, (B), in FIG. 3. The sample sequences (A) and (B) are respectively, applied to the absolute value circuits 35 and 37 which pass only the magnitudes of the applied samples. Samples from absolute value circuit 37 are applied as minuends to subtraction circuit 38 and samples from absolute value circuit 35 are applied as subtrahends to subtraction circuit 38 which generates signal samples corresponding to the difference of the applied samples. The sign bit of the difference is indicative of which sample I or Q is larger. For two's complement subtraction the sign bit is a logic zero for positive differences (Q>I) and a logic one for negative differences (Q<I).

The I and Q samples from absolute value circuits 35 and 37 are applied to switching circuit 39 and the sign bit from subtraction circuit 38 is applied to a control terminal of circuit 39. In response to the control signal switching circuit 39 always directs the larger of the I, Q samples to the divisor input port of pipeline divider circuit 42 and the smaller of the I, Q samples to the dividend input of divider circuit 42. Alternatively, the smaller of the samples may be applied to the divisor input port and the larger to the dividend input port. In the former case, the divider calculates values corresponding to the tangent defined by Q/I over a 45 degree range from the I axis, and in the latter, the divider 42 calculates the cotangent. Divider circuit 42 operates synchronously at the I, Q sample rate to generate the sequence of quotients illustrated by (C) in FIG. 3. The instantaneous quotients are applied as address signals to memory element 45 which produces the appropriate angle correction factors $\sin \Delta\phi$ and $\cos \Delta\phi$ for the chrominance vector angle defined by the arctangent of the instantaneous quotient. As will be explained below, the instantaneous quotients are actually combined with the I and Q sign bits to produce address codewords representing angles from 0 to 360 degrees. The sequence of correction factors are shown as sample sequences (D) and (E). The sequences (D) and (E) from memory element 45 are applied to a multiplexer 46 which outputs the sample sequence (J). Multiplexer 46 is controlled by a clock signal having pulses occurring at the sample rate of the I, Q samples applied to input port 32, i.e., at a rate equal to two times the color subcarrier frequency $f_{sc}$.

Figure 3:
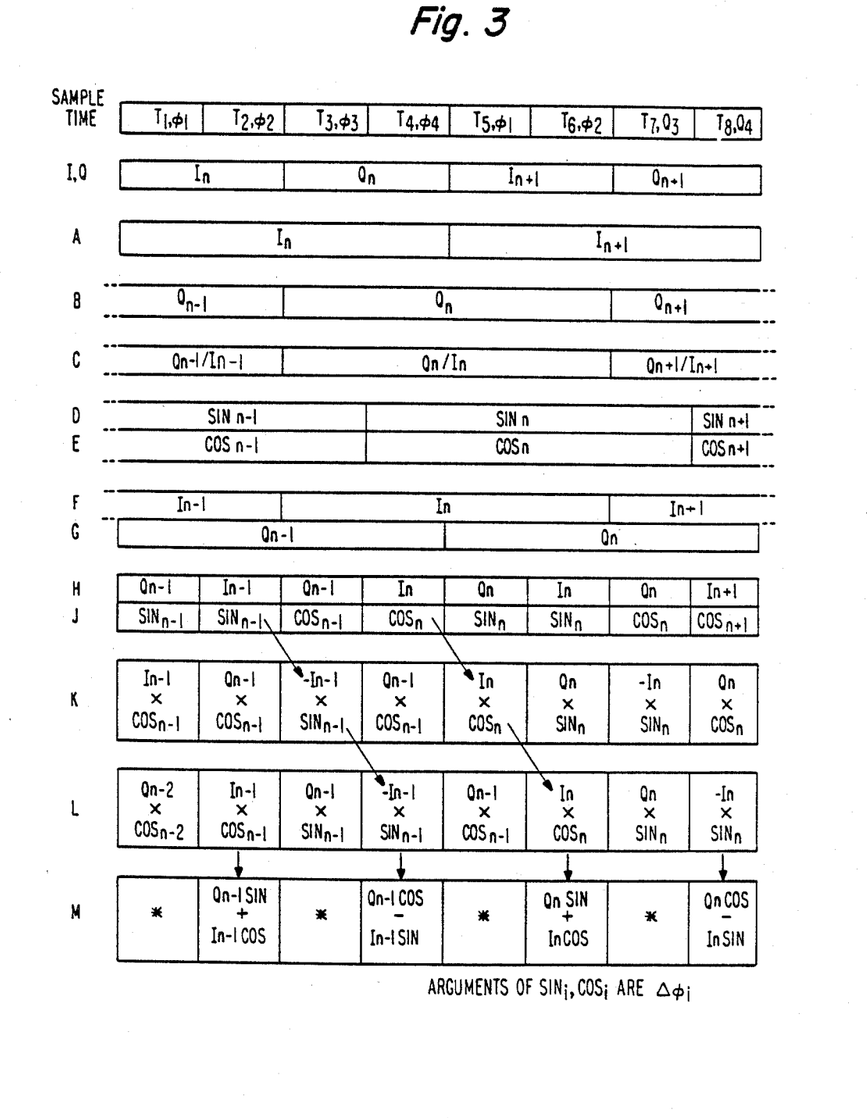
FIG. 3 is a table of samples indicating the sample values occurring at different points of the FIG. 2 circuit.

The I and Q samples from latches 34 and 36 are applied to delay element 48 which produces the sample sequences (F) and (G) appropriately timed so that they occur concurrently at multiplier 51 with their corresponding correction factors (D) and (E) of FIG. 3. Sequences (F) and (G) from delay element 48 are applied to the multiplexer 47 which is operated at four times the color subcarrier frequency to output the I, Q sample sequence (H). Samples from multiplexer (47) are applied to the two's complement circuit 55 which selectively inverts the polarity of particular I, Q samples to establish the desired ($\pm$) signs in equations (1) and (2). The samples from two's complement circuit 55 are applied to the multiplier 51 wherein they are multiplied by the sequence of correction factors produced by multiplexer 46. Multiplier 51 generates the sequence of products (K) which are applied to the latch 54 and to one input of adder 53. Latch 54 delays the products by one clock period, $T_i$, producing the sequence (L). The signs of the products in sequences (K) and (L) are for counter clockwise vector correction. The products output from latch 54 are applied to a second input of adder 53 which produces the sequence of sums of products (M). Note the time periods in sequence (M) having an asterisk indicate that the sum produced during that sample period is a meaningless sum relative to equations (1) and (2). The output sequence provided by adder circuit 53 is demultiplexed by latches 49 and 50 to produce the corrected color mixture signals I′ and Q′ each comprised of the respective alternate sums of sequence (M).

The two's complement circuit 55 and its controlling circuit 56 will be included when symmetry of hue correction about the I axis allows reduction of the size of memory element 45. If, however, the memory 45 contains a unique signed correction factor for each chrominance phasor angle, the ($\pm$) signs in equations (1) and (2) will be accommodated by the sign of the correction factors. In this instance, the two's complement circuit 55 and its control logic 56 will not be included.

Figure 4A:
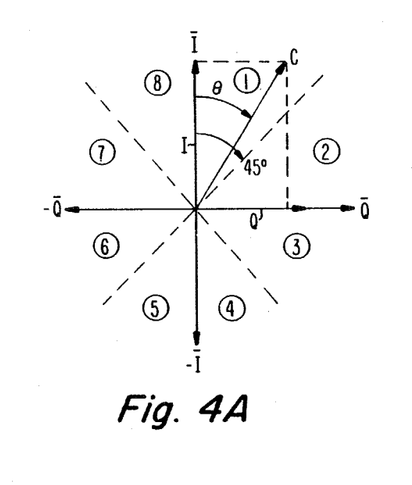
FIGS. 4A and 4B are a phasor diagram and table of logic values describing the chrominance vector in terms of I and Q color mixture signals.

Refer next to FIG. 4A which is a phasor diagram showing the axes of the I and Q chrominance components and an instantaneous chrominance vector C. The intersection of the I and Q axes form four 90 degree quadrants with the zero angular reference being along the positive I axis. The four quadrants are divided into eight sectors 1–8 each of which encompasses a 45 degree sector. Sector 1 is defined by samples I and Q both being positive with I>Q. With Q and I samples applied to the divider as dividend and divisor, respectively, the quotients produced correspond to the tangents of angles from zero to 45 degrees. As the chrominance vector or phasor moves into sector 2, Q>I and I and Q remain positive. In sector 2, I samples are applied to the dividend input of stage 1 of the divider circuit and Q samples are applied to the divisor input. As the chrominance vector translates from the 45 degree angle toward the $\pm$Q axis the quotients correspond to the tangents of angles from 45 degrees to zero degrees.

Similarly, as the chrominance phasor traverses each quadrant, the values represented by the quotients correspond to angles from 0 degrees to 45 degrees to zero degrees because only the magnitudes of the I and Q components are applied to the divider 42 and the smaller is always divided by the larger. The table of FIG. 4B indicates the sectors, the values of the chrominance phase angles $\theta$, the angles represented by the arctangents of the quotients and the sign bits of the I, Q and (Q−I) difference samples in the respective sectors.

Figure 4B:
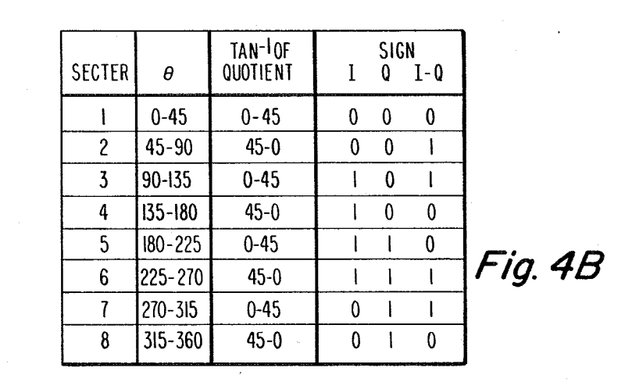

The I, Q and (Q-I) sign bits may be combined with the quotients from the divider circuit to generate memory address codes corresponding to angles from zero to 360 degrees. The memory 45 is programmed to respond directly to the address codes to produce correction factors for chrominance angles over the range of zero to 360 degrees. For example, assume first that the sign codes from FIG. 4B are appended to the quotients from divider 42 as the three MSB's, and that a particular binary quotient at bus 57 for an angle of 26 degrees is 10000. When the sign bits are appended the composite quotient is 00010000. The correction factors programmed at memory address location 00010000 corresponds to the correction factors for the instantaneous chrominance vector having an angle of 26 degrees. For the same quotient (57) in sector 2 the composite address is 00110000 corresponding to the angle 90−26 =64 degrees. The correction factors programmed at memory address location 00110000 corresponds to the correction factors for a chrominance vector having an angle of 64 degrees. Note that if the correction factors are symmetric about the positive I axis, the Q sign bit may be eliminated from the composite address, thereby halving the memory size. Note also that if correction factors are desired for a limited range of angles e.g., $\pm$90 degrees the memory address decoding structure can be arranged to output a "no correction" default value for the three MSB's of the address codes defined for sectors 3, 4, 5 and 6.

In the present application the memory is o programmed to output two correction factors (sin $\Delta\phi$ and cos $\Delta\phi$) for the address codewords. It will be appreciated that parallel memories may be implemented—one to provide correction factors corresponding to the sine function and the other to provide correction factors corresponding to the cosine function. Alternatively, the memory may be employed to produce only the, e.g., sine correction factors, and a sine-cosine converter implemented to generate the cosine factors from the sine values. One o illustrative argument function $\Delta\phi$ for auto flesh correction factors sin $\Delta\phi$ and cos $\Delta\phi$ over the range of $\pm$90 degrees is defined $$\Delta\phi = K \sin 2\theta \quad 0 < \theta < 90°$$
$$\text{and } -90° < \theta < 0°$$
$$\Delta\phi = 0 \quad \text{for } 90 < \theta < 270$$

where K is a constant and $\theta$ is the chrominance angle relative to the I axis. This function applies the greatest angular correction at $\pm$45 degrees, with the correction tending toward zero at $\pm$90 degrees and at zero degrees.

In FIG. 2 the sign bits are decoded before application to the memory element 45. The I and Q sample sign bits from latches 34 and 36 and the sign bit (sgn) from subtraction circuit 38 are applied to delay element 40 to appropriately time the sign bits with the corresponding quotients produced on bus 57. The delayed sign bits are applied to decoder 41 which produces, for example, a two bit code that is appended to bus 57. Decoder 41 generates a further control which is applied to the control input terminal of multiplexer 44. The combination of the quotient and two bit codewords are applied to one input port of multiplexer 44 and an address from source 43 for producing a "no correction" correction factor from memory element 45 is applied to a second input port of multiplexer 44. The multiplexer, responsive to the control signal, selectively applies the combined quotient or the "no correction" address to the address input port of memory element 45.

Assume that the desired hue correction is symmetrical about the positive I axis and that no correction is desired in sectors 4 and 5. The two bit code from the decoder must define sectors (1, 8), (2, 7) and (3, 6), and the control signal must be a first state for sectors 1, 2, 3, 6, 7 and 8 and a second state for sectors 4 and 5. The control signal is determined via a simple AND function defined in Boolean terms by : control signal = I. $\overline{(I-Q)}$ Assume the two bit apended to the quotients on bus 57 are to equal 00,01 and 10 for sectors 1 and 8, 2 and 7, 3 and 6 respectively. The LSB of the two bit code may be determined from the Boolean function $\overline{I}$. $(I-Q)+I$. $\overline{(I-Q)}$ and the MSB of the two-bit code by I. $(I-Q)$ which are easily realized in combinatorial logic by those skilled in the art of digital design.

If it is required to uniquely define a correction factor for all angles of the input chrominance phasor over the zero to 360 degree range, the parts count can be reduced by simply appending the sign bits to the quotients and eliminating decoder 41 and multiplexer 44. However, if the correction factors follow some angularly dependent symmetry, the use of decoder 41 and multiplexer 44 may result in a smaller parts count.

Next consider a system where the correction function is to be symmetrical about the positive I axis. Instantaneous chrominance vectors, C, to the right of the +I axis are to be corrected by counter clockwise rotation and instantaneous chrominance vectors to the left of the +I axis are to be corrected by clockwise rotation. To realize such symmetrical correction, the memory is programmed with correction factors for chrominance angles from zero to 180 degrees. The I sign bit and the (I−Q) sign bit are appended to the quotients from divider 42 and applied directly to the address input port of the memory. From FIGS. 4A and 4B it will be noted that the Q sign bit is not required to be included as part of the memory address because of the desired symmetry. The exemplary combinatorial logic circuitry 56 generates a control signal which is applied to the two's complement circuit 55 to appropriately invert or two's complement the polarity of the I, Q samples (H) to effect the desired direction of vector rotation. Reference to FIG. 3 and equations (1) and (2) indicate the samples, $I_i$, of sequence H which must be complemented to produce a counter clockwise rotation in sectors 1, 2, 3 and 4. The appropriate Ii samples occur during periods T2 and T6 when the Q samples are positive. Conversely, clockwise correction is desired in sectors 5, 6, 7 and 8 where the $Q_i$ samples are negative. For clockwise correction, the $Q_i$ samples occurring during periods T1 and T5 must be complemented. Thus, if an appropriately timed timing pulse is combined with the $Q_i$ sign bits, a control signal can be generated to selectively cause element 55 to complement the required samples for generating the desired sums of products defined by equations (1) and (2). The time periods $T_i$ are defined by the analog-to-digital sampling clock. From this sampling clock it is known how to generate four phase clocking signals in a conventional manner. Each phase has a pulse width equal to a period $T_i$ and repeats every fourth sample. Assume that a clock phase $\phi 1$ produces a pulse during sample period T1. The next successive $\phi 1$ pulses will occur during sample period T5, T9, etc. Similarly, clock phase $\phi 2$ occurs at sample periods T2, T6, T10... Circuit 56 ANDs clock phase $\phi 1$ (C$\phi 1$) with the appropriately delayed $Q_i$ sample sign bit from latch 36 and ANDs the complement of the $Q_i$ sample sign bit with clock phase $\phi 2$ (C$\phi 2$). The output signals from the ANDing operation are combined in a logic OR gate to produce the control signal which when applied to element 55 will effectuate symmetrical vector rotation.

For symmetrical correction of the chrominance phasor about the +I axis, nominally the correction factors are selected so that the corrected Q samples do not change sign. In addition, since the correction factors correspond to sines and cosines they have values less than one. Because the processing hardware cannot accommodate binary points (i.e., the equivalents of decimal points), the correction factors programmed in memory are inherently multiplied $2^P$ is the number of bits used to define the magnitude of the correction factors. The multiplier is thus a P by R bit multiplier where P and R are the number of bits defining the correction factors and the I, Q samples respectively. To compensate for the $2^P$ factor by which the correction factors are multiplied the output of the multiplier 51 is divided by $2^P$, e.g., the output samples are right shifted P bit positions. This division is performed in circuit element 52.

Note, however, that if the correction values stored are two's complement eight-bit binary numbers, the maximum positive value that can be realized is actually $2^P-1$(127 decimal). This corresponds to a correction factor of "1", i.e., cos 0° or sin 90°. Division by $2^7$, however, produces the result 127/128≠1 which is in error by a value of 1/128th. This error by itself may not be significant, however, in digital systems such errors are frequently cumulative with errors produced elsewhere in the system to produce a total error which is significant. Consider, however, that the maximum negative magnitude represented by seven bit numbers is 128 (decimal) corresponding to a correction factor of −1. Division of negative 128 by $2^7$ does produce a value of |1| with no error. Therefore, it is advantageous to store negative correction factors in the memory if the correction factors are all of like polarity.

If negative correction factors are stored in place of positive values in memory element 45 of FIG. 2, the negative values must be accounted for in the remaining circuitry. This may be done by two's complementing the products produced by multiplier 51 as indicated by the element 52. A second method is to design the circuitry 56 to generate control signals that complement the requisite $I_i$, $Q_i$ samples from multiplexer 47 so that the appropriate products produced by multiplier 51 are positive or negative. For the circuit 56 previously described, all that is necessary is to invert the output of the OR gate of element 56 by means of inverter 59.

Figure 5:
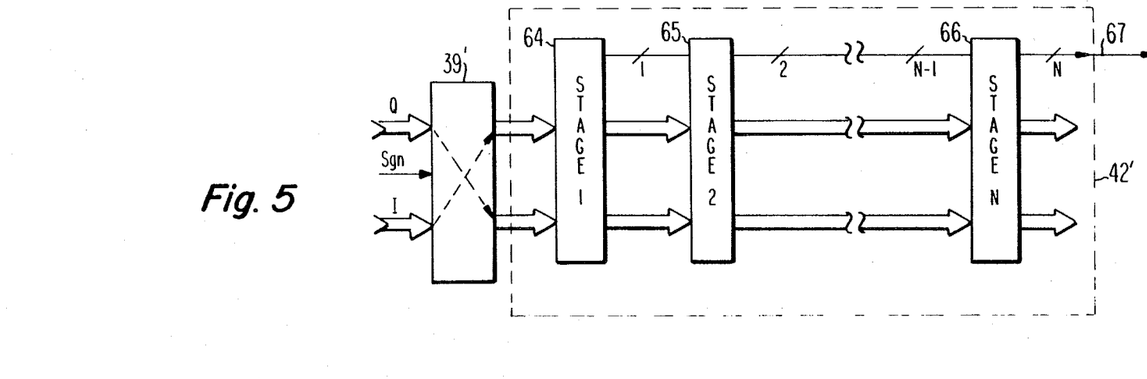
FIGS. 5, 6 and 8 are a block diagram and logic schematics of pipelined divider circuits for use in the FIG. 2 apparatus and embodying the present invention.

FIG. 5 illustrates a pipelined divider circuit 42' which may be implemented in the FIG. 2 circuit. Element 39' corresponds to element 39 in FIG. 2. In the figure, I, Q magnitude samples are applied to switching circuit 39', which, under control of the sign signal, directs the smaller of the samples to the dividend input port of stage 1 (64) and the larger of the samples to the divisor input port. Each stage 64–66 of the divider performs a subtraction of the divisor from the applied dividend. The sign bit of the difference is used in forming a partial quotient. Each stage contributes one more bit to the partial quotients. The divisor is translated from stage to stage at the sample rate. The dividend is bit shifted leftward one bit by each stage so that each successive subtraction produces a partial quotient related to a successively lesser significant bit position. The quotient produced by stage N is N bits wide and available at output bus 67.

Figure 6:
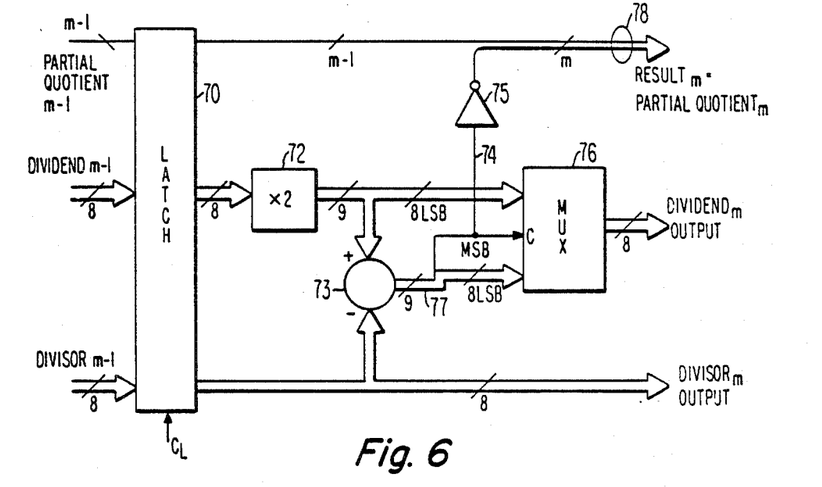

FIG. 6 illustrates the $m^{th}$ stage of the pipelined divider circuit. The stage consists of a latch circuit 70 synchronized to the sample rate by a clock signal CL. The latch stores a partial quotient of $(m-1)$ bits from the preceding stage, a dividend value from the preceding stage and a divisor value from the preceding stage. The number of bits of the dividend and divisor applied to the input of the latch of stage m and the number of bits of the dividend and divisor output by the $m^{th}$ stage remain the same. In addition, the value of the divisor is passed from the input to the divisor$_m$ output of the stage unaltered.

The dividend from latch 70 is applied to a times-two multiplier 72 which may be a hard-wired, shift-left bit-shifter, the output of which is applied as minuend to the subtraction circuit 73. The output sample from the times-two multiplier less the MSB from the times-two multiplier is applied to one input of a multiplexer 76. The divisor sample from latch 70 is applied as a subtrahend to subtraction circuit 73 and to the divisor$_m$ output port of the stage. The difference value from subtraction circuit 73 less the sign bit is applied to a second input port of multiplexer 76 and the sign bit is applied to the control input terminal of the multiplexer. For negative differences from subtraction circuit 73 the sign bit is a logic one, and responsive thereto, multiplexer 76 passes the dividend value less the MSB from the times-two multiplier to the dividend output port of the stage. For positive differences the sign bit is a logic zero and responsive to this signal multiplexer 76 passes the magnitude of the difference from subtraction circuit 73 to the dividend output port of the stage m. The sign bit from the subtraction circuit 73 is applied to an inverter 75 which inverts the bit signal. The inverted sign bit is then appended as the LSB to the $(m-1)$ partial quotient from latch 70 to form an m-bit partial quotient (78) which is applied to the partial quotient output port of the stage.

Operation of the cascade connection of individual divider stages as separately described in conjunction with FIG. 6 is as follows. Multiplication of the dividend by two in respective elements 72 in each successive stage increases the value of the dividend by one significant digit, base 2, and the divisor is subtracted therefrom. The subtractions performed stage by stage produce negative differences until the cumulative multiplied dividend exceeds the divisor and a positive difference is developed. The number of subtractions required to generate the first positive difference establishes the most significant non zero digit in the quotient. The value of the first positive difference now becomes the dividend for succeeding stages and division by subtraction is performed on the difference in the same manner.

Figure 7:
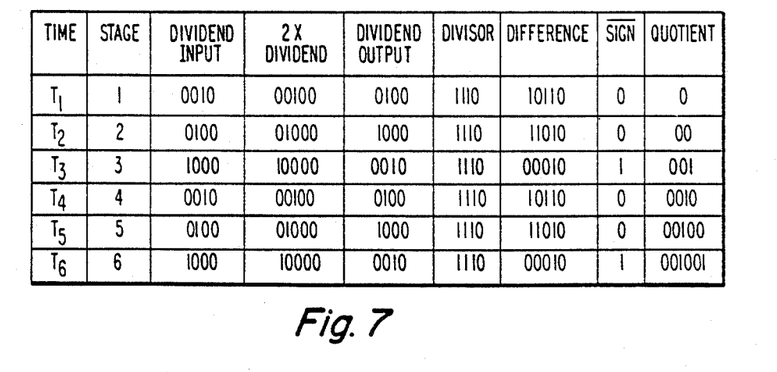
FIG. 7 is a table of values generated at various stages of a six stage pipelined divider of the type illustrated in FIG. 6 for an exemplary division of two by fourteen.

FIG. 7 is a table illustrating the binary values produced by the different stages of a divider having six cascaded stages for an exemplary division of binary two by binary fourteen in four bit codewords. The dividend and divisor applied to the first stage are respectively a binary two and fourteen. The quotient output by the sixth stage is 001001, which, if a decimal point is assumed to the left of the leftmost zero, equals 0.1406 and is substantially equal to $2/14 = 0.1403$. If the decimal is assumed to the right of the rightmost digit the quotient equals $(2/14)$ times $2^6$. All of the binary values in the table are positive magnitudes except for the values in the difference column which are in two's complement form with the leftmost bit being the sign bit.

Figure 8:
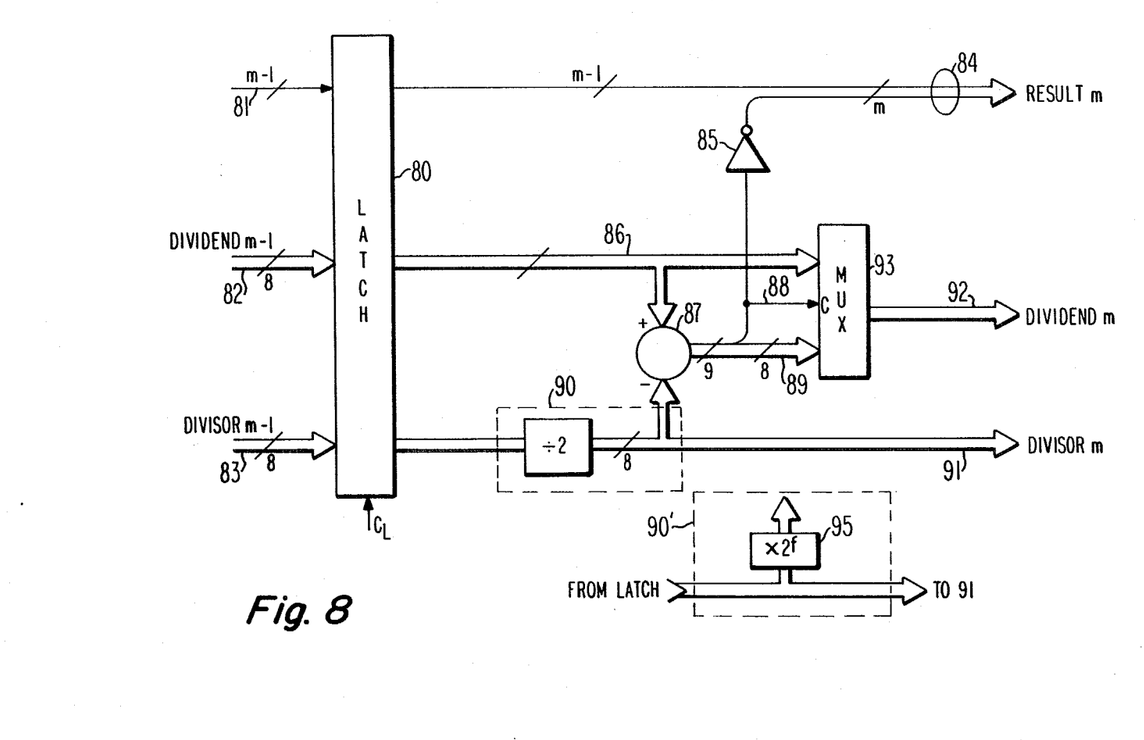

FIG. 8 is a further embodiment of a divider stage embodying the invention. The value of the dividend applied to the firstmost stage of such cascaded stages must generally be less than the value of the divisor. In the FIG. 8 divider stage, the divisor is divided by two by a divide-by-two stage 90 and subtracted in element 87 from the dividend available on bus 86. The complemented sign bit of the difference available from inverter 85 is appended (84) as the LSB to the partial quotient 81 from the previous stage. If the difference is positive, multiplexer 93 applies the magnitude of the difference to the dividend output port 92 of the stage, and if the difference is negative, applies the dividend from the previous stage (on bus 86) to port 92. The divisor available from bus 83, after being divided by two, is passed to the divisor output 91 for application to the succeeding stage.

In a slightly different arrangement the divide-by-two circuit 90 may be substituted with the circuit 90' shown in the inset of FIG. 8. Cirucit 90' includes a multiplier circuit 95 which multiplies the divisor by $2^f$ and applies the product as subtrahend to subtractor 87. The exponent f is an integer equal to $(K-M)$ where M is the number of the $m^{th}$ stage. The value of K is chosen to guarantee that the maximum value of the applied dividends is less than $2^K$ times the value of the divisor. For positive values of K, the value of the applied dividend may be larger than the applied divisor.

The exponent f is positive for the first K of the cascaded stages comprising the pipelined divider and the divisors are multiplied by powers of 2 in those stages. Starting with the $K+1^{st}$ and succeeding stages, the value of the divisor applied to the subtraction circuit of each successive stage is one-half the divisor applied to the subtraction circuit of the immediately preceding stage.

In the quotient produced by a cascade divider employing a positive value of (f) the K-MSB's represent whole numbers and the remaining bits represent fractional parts.

Negative values of K may be used to advantage where the expected dividend values are significantly less than the divisor values. Using negative K values obviates the stages which would ordinarily contribute leading zeros to the quotient. If it is known that the dividends and divisors occurring in the system will always produce K leading zeroes in the respective quotients, then a partial quotient of K zeroes may be applied to the quotient input of the first stage and a negative K value used in the exponent f of multiplier 95.

What is claimed is:
1. A binary divider comprising:
   means for applying binary dividend and binary divisor samples at a predetermined sample rate;

a plurality, N, of stages connected in cascade, said stages operating synchronously at the sample rate of the applied dividend and divisor samples, the first stage of the cascade connected stages having respective dividend and divisor input ports respectively coupled to the means for applying binary dividend and divisor samples, and the last stage of said cascade connection of stages having an output port at which a quotient corresponding to the dividend divided by the divisor is available and wherein each $m^{th}$ intermediate stage of the cascade connection includes;

a dividend, divisor and quotient input port and a dividend, divisor and quotient output port;

means having first and second input ports for producing signed difference samples of the value of samples applied to said first input terminal less the value of samples applied to said second input terminal;

respective means for coupling the dividend and divisor input ports to the first and second input ports of said means for producing signed differences;

means for combining a sample bit corresponding to the polarity of said difference with the quotient applied to the quotient input port as an appended least significant bit thereof; said combined quotient being applied to the stage quotient output port; and means responsive to the polarity of said differences for selectively applying the magnitude of said differences to a dividend output port of the stage for positive differences, or applying at least all but one of the sample bits applied to the first input port of the means for producing differences to the dividend output port of the stage for negative differences.

2. The binary divider set forth in claim 1 wherein the means for coupling the stage dividend input port to the first input port of the means for producing differences includes a times-two multiplier, and the means for coupling the stage divisor input port to the second input port of the means for producing differences does not alter the value of the divisor.

3. The binary divider set forth in claim 1 wherein the means for coupling the divisor input port of the stage to the second input port of the means for producing differences includes a divide by two circuit.

4. The binary divider set forth in claim 1 wherein the means for coupling the divisor input port of the stage to the second input port of the means for producing differences includes multiplying means for multiplying the divisor by $2^f$ where f is an integer whose value is dependent on the position of the respective stage in the cascade connection.

5. The binary divider set forth in claim 4 wherein the exponent f is negative valued.

6. The binaary divider set forth in claim 4 wherein the exponent f is positive valued.

7. The binary divider set forth in claim 4 wherein the value of the exponent f of each $m^{th}$ stage is equal to $-m$.

8. A binary divider comprising:

means for applying binary dividend and binary divisor samples at a predetermined sample rate;

a plurality, N, of stages connected in cascade, said stages operating synchronously at the sample rate of the applied dividend and divisor samples, the first stage of the cascade connected stages having respective dividend and divisor input ports respectively coupled to the means for applying binary dividend and divisor samples, and the last stage of said cascade connection of stages having an output port at which a quotient corresponding to the dividend divided by the divisor is available and wherein each $m^{th}$ intermediate stage of the cascade connection includes;

a dividend, divisor and quotient input port and a dividend, divisor and quotient output port;

means coupled to the stage dividend input port for multiplying the applied dividend by two;

means coupled to the times-two multiplying means and the divisor input port for producing a signed difference sample of the multiplied dividend samples less the value of the divisor samples;

means responsive to the sign of the difference samples for selectively applying the magnitude of the difference or the multiplied dividend less its MSB to the dividend output port of the stage;

means for combining the sample bit corresponding to the sign bit of the difference with the quotient applied to the quotient input port as an appended least significant bit thereof; said combined quotient being applied to the stage quotient output port; and means for coupling the divisor input port to the stage divisor output port.

9. The binary divider set forth in claim 8 wherein the means coupling the divisor input port to the stage divisor output port includes a latch circuit, and wherein the times-two multiplying means is coupled to the dividend input port by a further latch circuit.

10. The binary divider set forth in claim 8 wherein the means for combining the sign bit of the difference with the quotient includes a logic complementing circuit having an input terminal coupled to the sample bit corresponding to the sign bit of said differences.

11. The binary divider set forth in claim 9 including a further latch coupled between the quotient input port and the quotient output port, the latch for the respective $m^{th}$ stage having a capacity for an $(m-1)$-bit quotient.

12. A pipelined binary divider for dividing a binary dividend by a binary divisor wherein respective divisors are larger than respective dividends applied to said divider comprising:

a cascade connection of N stages a first stage of which has means for applying said dividend and said divisor to respective dividend and divisor input ports and a last stage at which an N-bit quotient is available; and wherein each stage includes;

a latch circuit for latching a partial quotient, for latching a dividend and for latching a divisor, said latch providing at respective output ports thereof said partial quotient, dividend and divisor;

a times-two multiplier serially coupled to the dividend output port of said latch;

a subtraction circuit having an output of said times two multiplier coupled thereto as minuend and having the divisor output of said latch coupled thereto as subtrahend, and having an output port;

a multiplexer having a first input port coupled to the output port of said times two multiplier less the most significant bit, a second input port coupled to the output port of said subtraction circuit less the most significant bit, having a control input coupled to a sign bit of the output port of said subtraction circuit, and having an output port which corresponds to a dividend output port of said stage;

a logic inverter having an input terminal coupled to the sign bit of said subtraction circuit output port and having an output terminal;

means for appending the output terminal of said inverter with the quotient output port of said latch in the least significant bit position; said appended quotient being an output quotient for the stage; and means for applying the divisor output port of said latch to a divisor output port of said stage.

13. A method of dividing the magnitude of a binary dividend sample by the magnitude of a larger binary divisor sample comprising the steps of:

A. multiplying the dividend by two and subtracting the divisor from the multiplied dividend to generate a difference including a sign bit;

B. Complementing the sign bit and arranging it as the LSB of a partial quotient;

C. generating a modified dividend equal to the magnitude of the difference if the difference is positive and equal to the multiplied dividend less its MSB if the difference is negative.

D. repeating steps A, B and C using the modified dividend, N-1 times to generate an N-bit quotient.

14. In a digital television receiver including a source of digital quadrature related first and second color mixture signals, apparatus for performing hue correction comprising:

a pipelined binary divider having a dividend input port and a divisor input port for coupling said first and second binary color mixture signals thereto and having a quotient output port, said divider including a plurality of cascade connected stages with each stage respectively including;

A. a dividend and a divisor input port;

B. first and second latches having input ports coupled to said dividend and divisor input ports of the respective stage;

C. A times two multiplier coupled to an output port of said first latch for multipling the applied dividend by two;

D. a subtraction circuit having first and second input ports respectively coupled to said times-two multiplier circuit and said second latch for producing at an output thereof the difference, including a sign bit, of the multiplier dividend less the divisor;

E. means responsive to said sign bit for applying said multiplied dividend to a dividend output for said sign bit representing a negative difference or applying the magnitude of the differences otherwise; and F. means for combining the sign bit from said subtraction circuit as the LSB to a partial quotient of the immediately preceding stage;

means coupled to the quotient output port for generating first and second correction factors corresponding to the sines and cosines of angles for each quotient for rotating the axis of said quadrature related color mixture signals;

means responsive to the quadrature related signals and said correction factors for generating the products of each color mixture signal times each correction factor; and means responsive to the products of the correction factors times the color mixture signals for producing the sums of the first color signal times the second correction factor plus the second color mixture signal times the first correction factor and the sums of the second color mixture signal times the second correction factor minus the first color mixture signal times the first correction factor.

* * * * *